United States Patent [19]

Goldswain et al.

[11] Patent Number: 5,375,855
[45] Date of Patent: * Dec. 27, 1994

[54] MECHANICAL FACE SEALS

[75] Inventors: Ian M. Goldswain, Maidenhead; Martin W. D. B. Hignett, London, both of United Kingdom

[73] Assignee: John Crane (UK) Limited, Slough, United Kingdom

[ * ] Notice: The portion of the term of this patent subsequent to Jun. 29, 2010 has been disclaimed.

[21] Appl. No.: 83,019

[22] Filed: Jun. 24, 1993

Related U.S. Application Data

[63] Continuation of Ser. No. 830,195, Jan. 31, 1992, Pat. No. 5,222,743.

[30] Foreign Application Priority Data

Feb. 15, 1991 [GB] United Kingdom ............... 9103217

[51] Int. Cl.$^5$ ............................................. F16J 15/34
[52] U.S. Cl. ................... 277/96.1; 277/81 R
[58] Field of Search .............. 277/96.1, 96, 81 R, 277/215

[56] References Cited

U.S. PATENT DOCUMENTS

| | | | |
|---|---|---|---|
| 4,212,475 | 7/1980 | Sedy | 277/96.1 |
| 4,733,873 | 3/1988 | Takenaka et al. | 277/96.1 |
| 4,889,348 | 12/1989 | Amundson et al. | 277/96.1 |
| 5,090,712 | 2/1992 | Pecht et al. | 277/96.1 |
| 5,201,531 | 4/1993 | Lai | 277/96.1 |

Primary Examiner—William A. Cuchlinski, Jr.
Assistant Examiner—Daniel G. DePumpo
Attorney, Agent, or Firm—Dorn, McEachran, Jambor & Keating

[57] ABSTRACT

A mechanical face seal includes a first sealing ring mounted non-rotatably and sealed with respect to a shaft and a second sealing ring mounted non-rotatably and sealed with respect to a housing, the second sealing ring being mounted in axial alignment with the first sealing ring and springs being provided to urge sealing faces of the first and second sealing rings into sealing engagement. The sealing face of the first sealing ring is provided with a plurality of grooved areas spaced angularly around its circumference, the grooved areas opening to one edge of the sealing face, a continuous annular dam formation being provided between the grooved areas and the other edge of the sealing face. Each grooved area defines at least two trailing edges relative to rotation in one direction and at least one trailing edge relative to rotation in the opposite direction, the trailing edges being defined by walls of the grooved area inclined in the plane of the face at an obtuse angle to said opposite direction of rotation, the trailing edges relative to each direction of rotation each being terminated by a transverse wall extending circumferentially of the seal face.

22 Claims, 2 Drawing Sheets

MECHANICAL FACE SEALS

This is a continuation of copending application Ser. No. 07/830,195 filed on Jan. 31, 1992 now U.S. Pat. No. 5,222,743.

BACKGROUND TO THE INVENTION

The present invention relates to mechanical face seals and in particular but not limited to seals for gases in which grooves are provided in one of the seal faces, to establish a cushion of gas between the seal faces when one seal face rotates relative to the other. The invention also relates to seals of this type for use with other fluids.

Hitherto, the grooves in such seals have normally been of helical configuration extending at an obtuse angle to the direction of rotation of the seal face. The grooves extend from one edge, part way across the seal face, a continuous annular dam formation being provided at the other edge of the seal face.

With grooves of such configuration, upon rotation of the face, fluid will move along the groove towards the end closed by the dam formation, further fluid being drawn into the open end of the groove. The closed end of the groove will impede further flow of fluid between the seal faces and will cause a build-up of pressure, forcing the seal faces apart, so that a cushion of fluid is produced between the seal faces. The grooves are designed so that the cushion of fluid will be maintained between the seal faces sufficient to prevent the faces coming into contact with one another, whilst avoiding significant leakage of fluid.

Helical grooves of the form disclosed above are however effective for relative rotation of the seal faces in only one direction, rotation of the seal faces in the other direction giving no hydrodynamic lift.

There is however a requirement for fluid seals of the type disclosed above which will act effectively for relative rotation of the seal faces in both directions.

It has been proposed to use grooved areas of triangular configuration, in which one wall of the grooved area will be inclined at an obtuse angle to the direction of rotation of the seal face, irrespective of the direction of rotation. Grooved areas of such configuration will produce lift between seal faces for relative rotation in both directions. However, as the walls of the triangular grooved areas are divergent, the number of grooved areas that may be accommodated around the circumference of the seal face will be significantly reduced in comparison to the number of helical grooves that could be accommodated. Consequently, the lift that may be produced in total between the seal faces will be significantly reduced.

The present invention provides a mechanical face seal of the type described above, with bidirectional groove profile with improved lift characteristics.

While in this specification the grooved areas are described in terms of triangular or trapezoidal configuration, it is intended that these terms should cover shapes of generally triangular or trapezoidal configuration defined by straight or curved sides.

SUMMARY OF THE INVENTION

According to one aspect of the present invention, a mechanical face seal for providing a seal between a pair of relatively rotatable components comprises; a first sealing ring adapted to be mounted non-rotatably and sealed with respect to one of said components; a second sealing ring adapted to be mounted non-rotatably and sealed with respect to the other component, said second sealing ring being mounted in axial alignment with the first sealing ring; and means being provided for resiliently urging an annular sealing face of the first sealing ring axially into sealing engagement with an annular sealing face of the second sealing ring; the sealing face of one of said sealing rings having a plurality of grooved areas spaced angularly around its circumference, the grooved areas opening to one edge of the sealing face, a continuous annular dam formation being provided between the grooved areas and the other edge of the sealing face, each grooved area having; at least two trailing edges in relation to one relative rotation between said faces, said trailing edges being defined by walls inclined in the plane of the face, each said trailing edge intersecting a corresponding circumferentially extending edge at an intersection point, said circumferentially extending edges being defined by a circumference of the said sealing face or by a substantially circumferentially extending wall, said trailing edges and each said corresponding circumferentially extending edge having a tangent line taken at said intersection point, the tangent lines defining an obtuse angle between the tangent lines of the trailing edge and of each corresponding circumferentially extending edge, the angle being taken relative to that portion of the tangent line which extends along said one direction of rotation; and at least one trailing edge relative to rotation in the opposite direction, said trailing edge defining a boundary between the grooved area and an adjacent ungrooved area, the grooved area being foremost of the ungrooved area with regard to the direction of relative rotation, the trailing edges further being defined by a wall inclined in the plane of the face at an obtuse angle to said opposite direction of rotation; the trailing edges relative to each direction of rotation each being terminated by a transverse wall extending circumferentially of the seal face.

According to a preferred embodiment of the invention, an angle formed at an intersection point of a trailing edge and the circumference of the sealing face between a tangent line of said trailing edge and a tangent line of said sealing face circumference where the angle is from 175° to 145° when the tangent line is taken relative to the angle of relative rotation, and more preferably from 165° to 145° to the angle of rotation.

In another embodiment, each grooved area has first and second spaced apart groove edges formed by groove walls, the first groove edge defining a point of intersection with the circumferential edge of the sealing face to which the grooved areas open, the groove wall of the second groove edge including at least two spaced apart groove wall portions, each groove wall portion extending from a point of commencement to a terminal point radially toward the dam and circumferentially in a direction away from the point of intersection of the first groove edge and the circumferential edge of the sealing face to which the groove areas open. In a preferred form of this embodiment, the grooved areas are non-symmetrical about a radius of the sealing face giving a different lift for relative direction of rotation of one ring relative to the other ring.

BRIEF DESCRIPTION OF THE DRAWINGS

The invention is now described, by way of example only, with reference to the accompanying drawings, in which.

DESCRIPTION OF A PREFERRED EMBODIMENT

Figure 1:
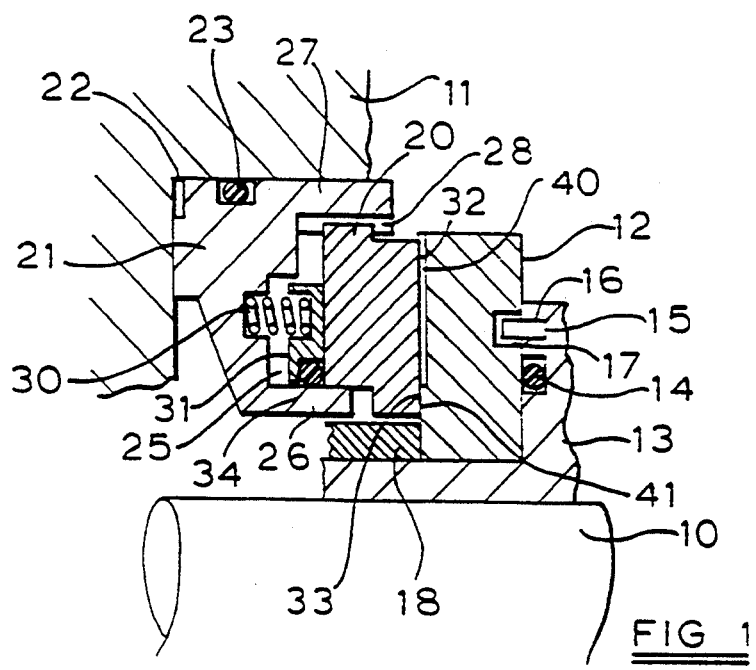
FIG. 1 illustrates in sectional elevation a seal in accordance with the present invention.

As illustrated in FIG. 1, a mechanical face seal for providing a gas-tight seal between a shaft 10 and housing 11 comprises a first sealing ring 12, which is located on a collar 13 secured to the shaft 10, in known manner. The sealing ring 12 is sealed with respect to the collar 13 by means of an elastomeric O-ring 14 or similar device and a pin 15 located in a bore 16 in a collar 13 extends into a corresponding bore 17 in sealing ring 12 to prevent relative rotation between sealing ring 12 and shaft 10. A sleeve 18 which is secured to collar 13 in suitable manner, prevents axial movement of the sealing ring 12.

A second sealing ring 20 is located in a retaining ring 21 which is secured in a recess 22 in housing 11, in suitable manner. The retaining ring 21 is sealed with respect to the housing 11 by means of elastomeric O-ring 23. The retaining ring 21 defines an annular recess 25 the sealing ring 20 being slidably located between walls 26 and 27 defining the recess 25 in axially opposed relationship to sealing ring 12. A plurality of ribs 28 are provided on the face of wall 27 engaged by sealing ring 20, the ribs 28 engaging in corresponding grooves in the outer periphery of sealing ring 20 to prevent relative rotation between the sealing ring 20 and housing 11.

A series of angularly spaced springs 30 act between the closed end of annular recess 25 and a thrust ring 31 which acts against the back of sealing ring 20, to urge face 32 of sealing ring 20 into sealing engagement with the opposed face 33 of sealing ring 12. The thrust ring 31 is sealed with respect to wall 26 of annular recess 25 and the sealing ring 20, by means of an elastomeric O-ring 34.

As shown in greater detail with reference to FIGS. 2 to 7, the sealing face 33 of sealing ring 12 has a plurality of angularly spaced grooved areas 40 which open to the outer periphery of sealing ring 12. The grooved areas 40 are typically from 2 to 20 microns in depth. A continuous dam formation 41 is provided adjacent the inner periphery of sealing ring 12 and is engaged by face 32 of sealing ring 20. The sealed fluid is contained within the housing 11 to the right (as illustrated in FIG. 1) of the sealing rings 12 and 20.

Figure 2:
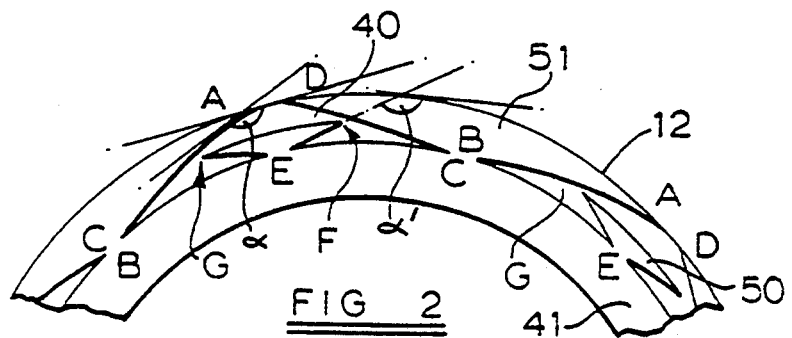
FIG. 2 shows a partial plan view of the sealing face of one of the sealing rings of the seal illustrated in FIG. 1.

As illustrated in FIG. 2, the grooved areas 40 are of generally trapezoidal configuration ABCD having a pair of parallel edges AD and BC, the edge AD being defined by the outer periphery of the sealing face 33 of sealing ring 12, to provide an opening to the grooved area 40 from that edge. The wall defining edge AB of grooved area 40 has a tangent line at the point of intersection of the edge AB and the sealing face circumference, which tangent line is inclined in the plane of the face 33 at an angle $\alpha$ of 160° to the tangent line taken at the point of intersection of the sealing face circumference, when the sealing ring 12 is rotating in a clockwise direction (as illustrated). Where used herein, the angle $\alpha$ is taken at the intersection point of the trailing edge (AB or CD) and of the circumference of the sealing face, the angle being defined by tangent lines of the trailing edge and of the sealing face circumference taken at the point of intersection. As shorthand herein, the angle $\alpha$ is described as between the trailing edge and the direction of rotation. The wall defining edge CD of the grooved area 40 is inclined at an angle $\alpha$ of 160° to the direction of rotation, when the sealing ring 12 is rotating in an anti-clockwise direction. A land formation 50 of generally triangular configuration EFG extends from the dam formation 41 into the grooved area 40, from the centre of the edge BC. The corners F and G of the land formation 50 being spaced from the edges AB and CD, respectively. The land 50 will define two further walls defined by edges EF and EG, a tangent of which, together with a tangent of the wall defined by corners F and G, provides the basis for defining an angle $\alpha'$. Where used herein, the angle $\alpha'$ is defined as the angle taken at the corners, either F or G, of the tangent lines of each of the circumferential arc FG and of the edge, whether EF or EG, respectively. As in the case of the angle $\alpha$, the angle $\alpha'$ is taken in the opposite direction from the direction of relative rotation of the sealing ring. For the sake of simplicity, a shorthand reference to the angle $\alpha'$ is used, the shorthand definition having the wall EF being inclined in the plane of face 33 at an angle $\alpha'$ of 150° to the direction of rotation, when a sealing ring 12 is rotating in a clockwise direction and wall EG being inclined in the plane of face 33 at an angle $\alpha'$ of 150° to the direction of rotation, when the sealing ring 12 is rotating in an anti-clockwise direction.

With the seal disclosed above, when sealing ring 12 is rotating in a clockwise direction, gas molecules within the grooved area 40 will drag against the opposed face 32 of sealing ring 20, so that they will move relatively towards the trailing walls defined by trailing edges AB and EF. The inclination of the walls defined by edges AB and EF will cause the gas to move inwardly, drawing further gas into the grooved area 40 through the open edge AD. Inward movement of the gas will be impeded by the transverse walls defined by edges BE and EC, which will cause an increase in pressure, causing the sealing ring 20 to lift away from sealing ring 12 and a cushion of gas to be built up between the sealing faces 32 and 33. Similarly, if the sealing ring 12 rotates in an anti-clockwise direction, gas within the grooved area 40 will be entrained to move inwardly along the walls defined by edges DC and GE, again creating a pressure and establishing a cushion of gas between the faces 32 and 33 of sealing rings 12 and 20.

As illustrated in FIG. 2, the grooved areas 40 of generally trapezoidal configuration are disposed at angularly spaced intervals around the outer periphery of the sealing face 33 of seal ring 12, adjacent corners B and C of each grooved area 40 being separated angularly from those of the adjacent grooved areas 40.

Figure 3:
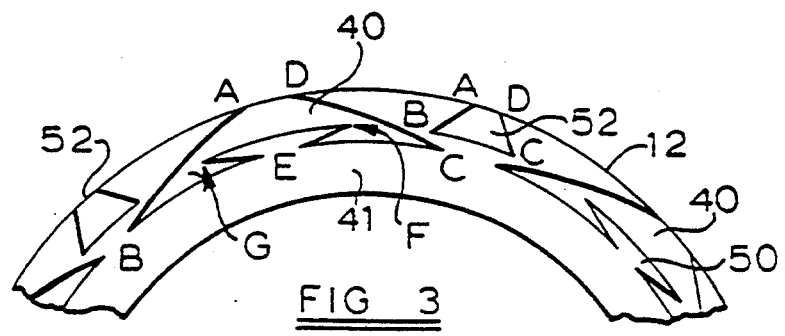
FIG. 3 shows a view similar to that shown in FIG. 2 illustrating a modification to the pattern of grooved areas.

In view of the divergent nature of the grooved areas 40, substantial ungrooved areas 51 are formed, intermediate of the grooved areas 40, around the outer periphery of the sealing face 33. As illustrated in FIG. 3, smaller grooved areas 52 may be formed in the intermediate areas 51 to improve lift between the sealing rings 12 and 20. These intermediate grooved areas 52 may be of similar configuration to the main grooved areas 40 or of other configurations. For example, as illustrated in FIG. 3, the intermediate grooved areas 52 may be of basic trapezoidal shape ABCD each providing only one trailing edge AB or CD which will provide lift for rotation in each direction.

Figure 4:
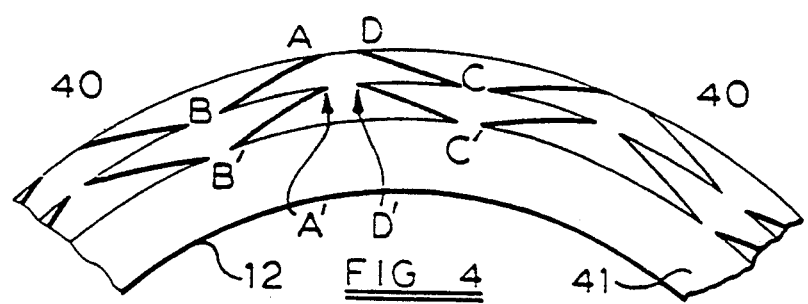
FIG. 4 shows a view similar to FIG. 2 illustrating an alternative grooved area configuration.

In the embodiment illustrated in FIG. 4, the grooved areas 40 are formed from two interconnected areas ABCD and A'B'C'D' of generally trapezoidal configuration. Area ABCD extends from the outer periphery of face 33, the edge AD forming an opening to the grooved area 40 and area A'B'C'D' extending from the centre of edge BC, edge A'D' forming an opening from area ABCD. This configuration of grooved area 40, provides two walls defined by trailing edges AB and A'B'; and CD and C'D', for rotation in clockwise and anti-clockwise directions respectively.

Figure 5:
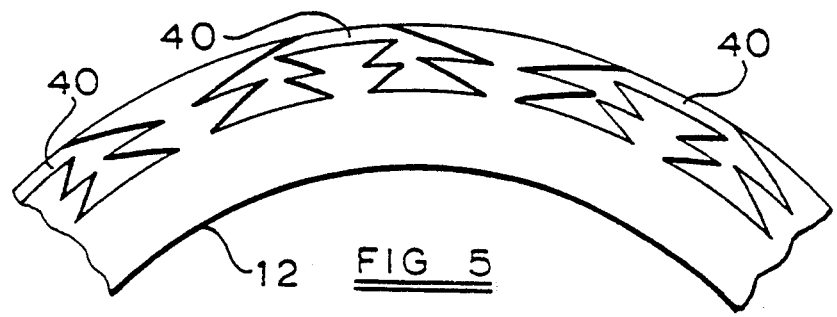
FIG. 5 shows a view similar to FIG. 2 illustrating a further alternative grooved area configuration.

In the embodiment illustrated in FIG. 5, grooved areas 40 are formed from a combination of areas of the configuration described with reference to FIGS. 2 and 4, in order to increase the number of trailing edges and thus lift points, for a given unit area.

The embodiments described above all provide symmetrical grooved areas providing two walls which will produce lift in each direction, so that equal lift will be produced irrespective of the direction of rotation.

In some applications, lift in one direction of rotation need not be the same as that in the other direction of rotation. For example, in a compressor, when operating in its primary direction of rotation, the grooved areas of the seal must provide sufficient lift to oppose the load applied by the sealed fluid acting on the end of the sealing ring 20 remote from face 32, as well as that applied by the springs 30; whereas on reverse rotation, the duration and speed may be lower so that a reduced amount of lift can be tolerated. The amount of lift produced by the grooved areas 40 will depend upon; the inclination of the walls defined by the trailing edges to the direction of rotation, and upon the number and lengths of such walls.

Figure 6:
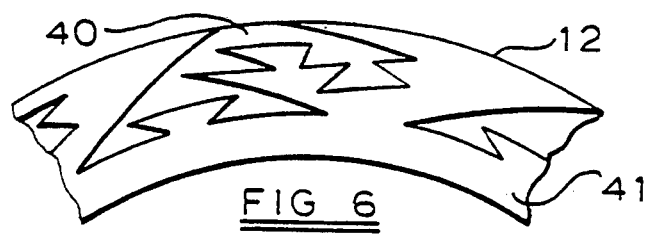
FIG. 6 shows a view similar to FIG. 2 illustrating a modification to the grooved area configuration.

In the embodiment illustrated in FIG. 6, the grooved areas 40 are defined by various combinations of areas of the configuration described with reference to FIG. 2 and FIG. 4, in order to provide an assymetric arrangement having different numbers of trailing edges and hence lift points, for each direction of rotation. The length and inclination of these walls may also be varied as required.

Figure 7:
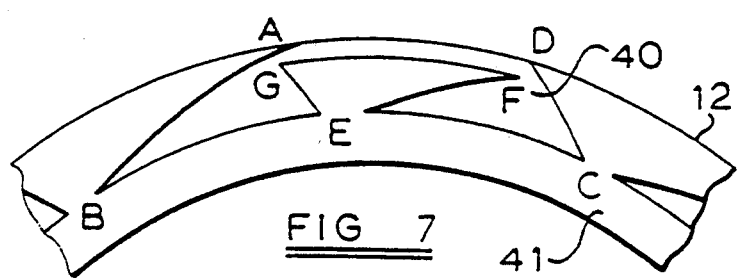
FIG. 7 shows a view similar to FIG. 2 illustrating an alternative modification to the grooved area configuration.

FIG. 7 illustrates a modification to the embodiment illustrated in FIG. 2, in which the inclination of the trailing walls of the trapezoidal area ABCD and triangular land EFG are varied, for example wall AB being inclined at 165° to the direction of rotation in a clockwise direction while wall DC is inclined at 145° to the direction of rotation in the anticlockwise direction, in order to adjust the lift obtained for rotation in each direction, as required.

Various modifications may be made without departing from the invention. For example, while in the above embodiments the grooved areas 40 are provided in the sealing face of a sealing ring 12 which rotates with the shaft 10, the grooved areas 40 may alternatively be provided in the stationary sealing ring, drag of the gas molecules against the flat rotating sealing ring causing the gas molecules to move along the trailing edges of the grooved areas in the stationary sealing ring. Grooved areas may alternatively be provided at the inner periphery of the sealing face with a dam formation at the outer periphery or grooved areas may be provided at both the inner and outer peripheries with a continuous dam formation therebetween.

While in the above embodiments grooved areas based on triangular or trapezoidal shapes have been disclosed, grooved areas based on other shapes or combinations of shapes which will provide the required trailing walls for each direction of rotation, may be used. As disclosed with reference to FIG. 3, grooved areas in accordance with the present invention may be used in combination with other grooved areas which will present only one trailing wall in each direction.

We claim:

1. A mechanical face seal for providing a seal between a pair of relatively rotatable components comprising a first sealing ring adapted to be mounted non-rotatably on one of said components and sealed with respect to said one component; a second sealing ring adapted to be mounted non-rotatably on the other component and sealed with respect to said other component, said second sealing ring being mounted in axial alignment with the first sealing ring; and means being provided for resiliently urging an annular sealing face of the first sealing ring axially into sealing engagement with an annular sealing face of the second sealing ring; the sealing face of one of said sealing rings having a plurality of grooved areas spaced around its circumference, the grooved areas opening to one edge of the sealing face, a continuous annular dam formation being provided between the grooved areas and the other edge of the sealing face, each grooved area having:

at least two edges trailing in relation to one direction of relative rotation between said faces, said trailing edges defining a boundary between the grooved area and an adjacent ungrooved area, the grooved area being foremost of the ungrooved area with regard to the direction of relative rotation, the trailing edges further being defined by walls inclined in the plane of the face, each said trailing edge intersecting a corresponding circumferentially extending edge at an intersection point, at least one of said circumferentially extending edges being defined by a circumference of the said sealing face and at least another of said circumferentially extending edges being defined by a substantially circumferentially extending wall, said trailing edges and each said corresponding circumferentially extending edge having a tangent line taken at said intersection point, the tangent lines defining an obtuse angle between the tangent lines of the trailing edge and of each corresponding circumferentially extending edge, the angle being taken relative to that portion of the tangent line which extends along said one direction of relative rotation; and the trailing edges each being terminated by a transverse wall extending substantially circumferentially of the seal.

2. A mechanical face seal for providing a seal between a pair of relatively rotatable components comprising a first sealing ring adapted to be mounted non-rotatably on one of said components and sealed with respect to said one component; a second sealing ring adapted to be mounted non-rotatably on the other component and sealed with respect to said other component, said second sealing ring being mounted in axial alignment with the first sealing ring; and means being provided for resiliently urging an annular sealing face of the first sealing ring axially into sealing engagement with an annular sealing face of the second sealing ring; the sealing face of one of said sealing rings having a plurality of spaced apart grooved areas disposed around its circumference, with said grooved areas open to one circumferential edge of the sealing face, a continuous annular dam provided between the grooved areas and the other circumferential edge of said sealing face, each grooved area having:

first and second spaced apart groove edges formed by groove walls, said first groove edge defining a point of intersection with said circumferential edge of said sealing face to which said grooved areas open, said groove wall of said second groove edge including at least two spaced apart groove wall portions, each said groove wall portion extending from a point of commencement to a terminal point radially toward said dam and circumferentially in a direction away from said point of intersection of said first groove edge and said circumferential edge of said sealing face to which said groove areas open.

3. The seal according to claim 2 wherein said spaced apart groove wall portions of said second groove edge are joined by a substantially circumferential groove wall portion extending from the terminal point of one of said at least two spaced apart groove wall portions to the point of commencement of the other of said at least two spaced apart groove wall portions.

4. The seal according to claim 3 wherein said second groove edge comprises a trailing edge of said grooved area in terms of the relative rotation of said sealing face of said one of said sealing rings with respect to the sealing face of the other sealing ring.

5. The seal according to claim 4 wherein one of said at least two spaced apart groove wall portions of said second groove edge terminates at said dam.

6. The seal according to claim 5 wherein another of said spaced apart groove wall portions, not terminating at said dam, has a terminal point at an intersection with a substantially circumferential groove wall portion extending from said terminal point to the point of commencement of the spaced apart groove wall portion terminating at said dam.

7. The seal according to claim 6 wherein the terminal point of said spaced apart groove wall portion which terminates at said dam is positioned circumferentially in a direction away from said first edge of said grooved area relative to the terminal point of said spaced apart groove wall portion which terminates at said intersection with said circumferential wall portion.

8. The seal according to claim 7 wherein the intersection of said spaced apart groove wall portion which terminates at said dam and said circumferential wall portion is spaced from said terminal point of said other spaced apart groove wall portion circumferentially in a direction toward said first edge of said grooved area.

9. The seal according to claim 4 wherein said second groove edge intersects said circumferential edge of said sealing face to which said groove areas open at a second point of intersection, said first groove edge being defined by at least one groove wall portion extending from its point of intersection with said circumferential edge of said sealing face to a terminal point radially toward said dam and circumferentially in a direction away from said second intersection point.

10. The seal according to claim 9 wherein the point of commencement of one of said at least two spaced apart groove wall portions of said second groove edge is identical to said second intersection point.

11. The seal according to claim 10 wherein one of said at least two spaced apart groove wall portions of said second groove edge terminates at said dam.

12. The seal according to claim 11 wherein said spaced apart groove wall portion which commences at said second intersection point has a terminal point at an intersection with a substantially circumferential groove wall portion extending from said terminal point to the point of commencement of another one of said spaced apart groove wall portions of said second edge.

13. The seal according to claim 12 wherein the terminal point of said spaced apart groove wall portion which terminates at said dam is positioned circumferentially in a direction away from said first edge of said grooved area relative to the terminal point of said spaced apart groove wall portion which terminates at said intersection with said circumferential wall portion.

14. The seal according to claim 13 wherein the intersection of said spaced apart groove wall portion which terminates at said dam and said circumferential wall portion is spaced from said terminal point of said other spaced apart groove wall portion circumferentially in a direction toward the first edge of said grooved area.

15. The seal according to claim 14 wherein said first and second spaced apart groove edges each terminate at a terminus disposed at said dam, said terminus of said first edge being joined to said terminus of said second edge by a substantially circumferential groove wall which is substantially concentric to said circumferential edge of said annular sealing face.

16. The seal according to claim 11 wherein said spaced apart groove wall portion which commences at said second intersection point has a terminal point at an intersection with a substantially circumferential groove wall portion extending from said terminal point to the point of commencement of said spaced apart groove wall portions of said second edge which terminates at said dam.

17. The seal according to claim 4 wherein said grooved areas are non-symmetrical about a radius of the sealing face giving a different lift for relative direction of rotation of one ring relative to the other ring.

18. The seal according to claim 2 wherein said grooved areas are non-symmetrical about a radius of the sealing face giving a different lift for relative direction of rotation of one ring relative to the other ring.

19. The seal according to claim 2 wherein said second groove edge comprises the trailing edge of said grooved area in terms of the relative rotation of said sealing face of said one of said sealing rings with respect to the sealing face of the other sealing ring.

20. The seal according to claim 19 wherein one of said at least two spaced apart groove wall portions of said second groove edge terminates at said dam.

21. The seal according to claim 20 wherein said first and second spaced apart groove edges each terminate at a terminus disposed at said dam, said terminus of said first edge being joined to said terminus of said second edge by a substantially circumferential groove wall which is substantially concentric to said circumferential edge of said annular sealing face.

22. The seal according to claim 2 wherein said first and second spaced apart groove edges each terminate at a terminus disposed at said dam, said terminus of said first edge being joined to said terminus of said second edge by a substantially circumferential groove wall which is substantially concentric to said circumferential edge of said annular sealing face.

* * * * *